(12) United States Patent
Souder et al.

(10) Patent No.: US 11,663,549 B2
(45) Date of Patent: *May 30, 2023

(54) SYSTEMS AND METHODS FOR FACILITY MATCHING AND LOCALIZATION

(71) Applicant: BXB Digital Pty Limited, Sydney (AU)

(72) Inventors: Michael Souder, Fremont, CA (US); Ryan Daigle, Fremont, CA (US); Shankar Jayaraman, Fremont, CA (US); Raj Valame, Palo Alto, CA (US)

(73) Assignee: BXB Digital Pty Limited, Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,248

(22) Filed: Nov. 10, 2020

(65) Prior Publication Data

US 2021/0073724 A1   Mar. 11, 2021

Related U.S. Application Data

(63) Continuation of application No. 15/969,159, filed on May 2, 2018, now Pat. No. 10,832,208.

(Continued)

(51) Int. Cl.
*H04W 64/00*   (2009.01)
*G06K 17/00*   (2006.01)
(Continued)

(52) U.S. Cl.
CPC ......... *G06Q 10/087* (2013.01); *G06F 16/955* (2019.01); *G06F 16/9537* (2019.01); *G06Q 10/0833* (2013.01); *G06Q 50/28* (2013.01)

(58) Field of Classification Search
CPC .. G06Q 10/087; G06Q 10/0833; G06Q 50/28; G06F 16/955; G06F 16/9537
See application file for complete search history.

(56) References Cited

U.S. PATENT DOCUMENTS

| 681,428 A | 8/1901 | Ambrose |
| 5,438,607 A | 8/1995 | Przygoda, Jr. et al. |

(Continued)

FOREIGN PATENT DOCUMENTS

| CA | 2185354 | 9/1995 |
| CN | 101809601 | 3/2015 |

(Continued)

OTHER PUBLICATIONS

Anonymous, "Geo-Fence", Wikipedia, Available Online at, URL:https://en.wikipedia.0rg/w/index.php?title=Geofence&oldid=768541623, Mar. 4, 2017, 3 pages.

(Continued)

*Primary Examiner* — Talia F Crawley
(74) *Attorney, Agent, or Firm* — Kilpatrick Townsend & Stockton LLP (57) ABSTRACT

Provided are methods, including computer-implemented methods, devices, and computer-program products applying systems and methods for facility matching and localization. According to some embodiments of the invention, the location of a pallet at a facility within a supply chain may be determined from location data received from a beacon on the pallet. In some embodiments, the position of the pallet within the facility may also be determined. Thus, the status of pallets may be monitored as they move through the supply chain.

20 Claims, 7 Drawing Sheets

Related U.S. Application Data (60) Provisional application No. 62/500,461, filed on May 2, 2017.

(51) Int. Cl.
*G06Q 10/087* (2023.01)
*G06F 16/955* (2019.01)
*G06F 16/9537* (2019.01)
*G06Q 10/0833* (2023.01)
*G06Q 50/28* (2012.01)

(56) References Cited

U.S. PATENT DOCUMENTS

| | | |
|---|---|---|
| 5,491,486 A | 2/1996 | Welles, II et al. |
| 5,691,980 A | 11/1997 | Welles, II et al. |
| 5,774,876 A | 6/1998 | Woolley et al. |
| 5,844,482 A | 12/1998 | Guthrie et al. |
| 6,199,488 B1 | 3/2001 | Favaron et al. |
| 6,294,114 B1 | 9/2001 | Muirhead |
| 6,373,389 B1 | 4/2002 | Przygoda, Jr. et al. |
| 6,415,223 B1 | 7/2002 | Lin et al. |
| 6,483,434 B1 | 11/2002 | Umiker |
| 6,600,418 B2 * | 7/2003 | Francis .............. G06K 17/00 700/229 |
| 6,661,339 B2 | 12/2003 | Muirhead |
| 6,667,936 B1 | 12/2003 | Ditzig |
| 6,669,089 B2 | 12/2003 | Cybulski et al. |
| 6,700,533 B1 | 3/2004 | Werb et al. |
| 6,707,381 B1 | 3/2004 | Maloney |
| 6,717,517 B2 | 4/2004 | Przygoda, Jr. |
| 6,718,888 B2 | 4/2004 | Muirhead et al. |
| 6,749,418 B2 | 6/2004 | Muirhead |
| 6,814,287 B1 | 11/2004 | Chang et al. |
| 6,900,815 B2 | 5/2005 | Yoshioka |
| 6,934,625 B2 | 8/2005 | Haddad |
| 6,943,678 B2 | 9/2005 | Muirhead |
| 7,026,937 B2 | 4/2006 | Przygoda, Jr. |
| 7,034,683 B2 | 4/2006 | Ghazarian |
| 7,100,052 B2 | 8/2006 | Ghazarian |
| 7,133,704 B2 | 11/2006 | Twitchell, Jr. |
| 7,155,264 B2 | 12/2006 | Twitchell, Jr. |
| 7,173,529 B2 | 2/2007 | Przygoda, Jr. |
| 7,209,771 B2 | 4/2007 | Twitchell, Jr. |
| 7,242,306 B2 | 7/2007 | Wildman et al. |
| 7,252,230 B1 | 8/2007 | Sheikh et al. |
| 7,313,476 B2 | 12/2007 | Nichols et al. |
| 7,336,152 B2 | 2/2008 | Horwitz et al. |
| 7,336,167 B2 | 2/2008 | Olsen, III et al. |
| 7,336,182 B1 | 2/2008 | Baranowski et al. |
| 7,342,496 B2 | 3/2008 | Muirhead |
| 7,365,737 B2 | 4/2008 | Marvit et al. |
| 7,388,492 B2 | 6/2008 | Watanabe |
| 7,398,153 B2 | 7/2008 | Workman et al. |
| 7,400,259 B2 | 7/2008 | O'Connor et al. |
| 7,443,297 B1 | 10/2008 | Baranowksi et al. |
| 7,446,658 B2 | 11/2008 | Panotopoulus |
| 7,564,357 B2 | 7/2009 | Baranowski et al. |
| 7,633,389 B2 | 12/2009 | Montovani et al. |
| 7,656,278 B2 | 2/2010 | Onishi et al. |
| 7,668,596 B2 | 2/2010 | Von Arx et al. |
| 7,735,430 B2 | 6/2010 | Muirhead |
| 7,742,745 B2 | 6/2010 | Twitchell, Jr. |
| 7,752,980 B2 | 7/2010 | Muirhead |
| 7,783,423 B2 | 8/2010 | Verma et al. |
| 7,789,024 B2 | 9/2010 | Muirhead |
| 7,804,400 B2 | 9/2010 | Muirhead |
| 7,874,256 B2 | 1/2011 | Muirhead |
| 7,903,084 B2 | 3/2011 | Marvit et al. |
| 7,948,371 B2 | 5/2011 | Muirhead |
| 7,956,746 B2 | 6/2011 | Truscott et al. |
| 7,963,235 B2 | 6/2011 | Muirhead |
| 7,999,670 B2 | 8/2011 | McClellan et al. |
| 8,036,826 B2 | 10/2011 | MacIntosh et al. |
| 8,041,079 B2 | 10/2011 | Chiu et al. |
| 8,077,040 B2 | 12/2011 | Muirhead |
| 8,095,070 B2 | 1/2012 | Twitchell, Jr. |
| RE43,178 E | 2/2012 | Ghazarian |
| 8,111,157 B2 | 2/2012 | Diener et al. |
| 8,159,338 B2 | 4/2012 | Breed |
| 8,184,852 B2 | 5/2012 | Hofman et al. |
| 8,204,439 B2 | 6/2012 | Twitchell, Jr. |
| 8,210,107 B2 | 7/2012 | Muirhead |
| 8,219,558 B1 * | 7/2012 | Trandal ................ G06Q 50/16 707/736 |
| 8,229,473 B1 | 7/2012 | De La Rue |
| 8,248,242 B2 | 8/2012 | Caliri et al. |
| 8,269,605 B2 | 9/2012 | Moore |
| 8,313,594 B2 | 11/2012 | Muirhead |
| 8,331,862 B2 | 12/2012 | Twitchell, Jr. |
| 8,347,794 B2 | 1/2013 | Muirhead |
| 8,511,555 B2 | 8/2013 | Babcock et al. |
| 8,514,058 B2 | 8/2013 | Cameron |
| 8,585,850 B2 | 11/2013 | Muirhead |
| 8,594,923 B2 | 11/2013 | Wong et al. |
| 8,630,768 B2 | 1/2014 | McClellan et al. |
| 8,692,764 B2 | 4/2014 | Marvit et al. |
| 8,694,251 B2 | 4/2014 | Janardhanan et al. |
| 8,718,372 B2 | 5/2014 | Holeva et al. |
| 8,830,072 B2 | 9/2014 | Batra et al. |
| 8,849,007 B2 | 9/2014 | Holeva et al. |
| 8,977,032 B2 | 3/2015 | Holeva et al. |
| 9,025,827 B2 | 5/2015 | Holeva et al. |
| 9,025,886 B2 | 5/2015 | Holeva et al. |
| 9,082,195 B2 | 7/2015 | Holeva et al. |
| 9,087,384 B2 | 7/2015 | Holeva et al. |
| 9,230,227 B2 | 1/2016 | Muirhead |
| 9,466,198 B2 | 10/2016 | Burch et al. |
| 9,488,986 B1 | 11/2016 | Solanki |
| 9,504,414 B2 | 11/2016 | Coza et al. |
| 9,613,239 B2 | 4/2017 | Lee et al. |
| 9,635,346 B2 | 4/2017 | Iida |
| 9,656,485 B2 | 5/2017 | Asai et al. |
| 9,679,237 B2 | 6/2017 | Linkesch et al. |
| 9,813,850 B2 | 11/2017 | Lee et al. |
| 9,868,212 B1 | 1/2018 | Hinterstoisser |
| 9,947,196 B2 | 4/2018 | Lee et al. |
| 9,965,662 B2 | 5/2018 | Lee et al. |
| 10,102,629 B1 | 10/2018 | Li |
| 10,242,273 B1 | 3/2019 | Eckman |
| 10,328,578 B2 | 6/2019 | Holz |
| 10,339,619 B2 | 7/2019 | Muirhead |
| 10,346,797 B2 | 7/2019 | Jacobus et al. |
| 10,347,005 B2 | 7/2019 | Iida et al. |
| 10,368,222 B2 | 7/2019 | Carlson et al. |
| 10,491,375 B2 | 11/2019 | Maggu et al. |
| 10,549,885 B2 | 2/2020 | de Bokx et al. |
| 10,614,319 B2 | 4/2020 | Douglas et al. |
| 10,816,637 B2 | 10/2020 | Conners et al. |
| 10,824,904 B2 | 11/2020 | Souder et al. |
| 10,825,120 B2 * | 11/2020 | Daigle ............... G06Q 10/0833 |
| 10,832,208 B2 | 11/2020 | Souder et al. |
| 10,867,301 B2 | 12/2020 | Withrow et al. |
| 2002/0047850 A1 | 4/2002 | Yoshioka |
| 2002/0070862 A1 * | 6/2002 | Francis ................ G06Q 10/087 340/988 |
| 2003/0083964 A1 | 5/2003 | Horwitz et al. |
| 2003/0089771 A1 | 5/2003 | Cybulski et al. |
| 2003/0137968 A1 | 7/2003 | Lareau et al. |
| 2003/0170357 A1 | 9/2003 | Garwood |
| 2004/0015264 A1 | 1/2004 | Holland et al. |
| 2004/0103031 A1 * | 5/2004 | Weinschenk ....... G06Q 30/0239 705/28 |
| 2004/0113786 A1 | 6/2004 | Maloney |
| 2004/0233041 A1 | 11/2004 | Bohman et al. |
| 2005/0046567 A1 | 3/2005 | Mortenson et al. |
| 2005/0063590 A1 | 3/2005 | Simon et al. |
| 2005/0226489 A1 | 10/2005 | Beach et al. |
| 2005/0231366 A1 | 10/2005 | McHugh et al. |
| 2005/0247775 A1 | 11/2005 | Gloekler et al. |
| 2006/0232412 A1 | 10/2006 | Tabacman et al. |
| 2006/0254474 A1 | 11/2006 | Roth et al. |
| 2006/0261959 A1 | 11/2006 | Worthy et al. |
| 2007/0091292 A1 | 4/2007 | Cho et al. |

(56) References Cited

U.S. PATENT DOCUMENTS

| | | |
|---|---|---|
| 2007/0095905 A1 | 5/2007 | Kadaba |
| 2007/0108296 A1 | 5/2007 | Konopka et al. |
| 2007/0115859 A1 | 5/2007 | Meyers |
| 2007/0282482 A1 | 12/2007 | Beucher et al. |
| 2008/0052205 A1 | 2/2008 | Dolley et al. |
| 2008/0106468 A1* | 5/2008 | Litva ............... G01V 15/00 342/451 |
| 2008/0114487 A1 | 5/2008 | Schuler et al. |
| 2008/0143484 A1 | 6/2008 | Twitchell |
| 2008/0198001 A1 | 8/2008 | Sarma et al. |
| 2009/0101712 A1 | 4/2009 | Ulrich et al. |
| 2010/0006377 A1 | 1/2010 | McCabe |
| 2010/0299278 A1 | 11/2010 | Kriss et al. |
| 2010/0310182 A1 | 12/2010 | Kroepfl et al. |
| 2010/0332407 A1 | 12/2010 | Grieve et al. |
| 2011/0040440 A1 | 2/2011 | de Oliveira et al. |
| 2011/0054979 A1 | 3/2011 | Cova |
| 2011/0095871 A1 | 4/2011 | Kail et al. |
| 2011/0169636 A1 | 7/2011 | Kadaba |
| 2011/0227725 A1 | 9/2011 | Muirhead |
| 2011/0251920 A1* | 10/2011 | Watson ............... G06Q 30/06 705/26.9 |
| 2011/0260869 A1 | 10/2011 | Gagnon |
| 2011/0265695 A1 | 11/2011 | Moore et al. |
| 2011/0266338 A1 | 11/2011 | Babcock et al. |
| 2012/0066511 A1 | 3/2012 | Scheidt et al. |
| 2012/0105202 A1* | 5/2012 | Gits ............... G01S 5/0054 340/8.1 |
| 2012/0126000 A1 | 5/2012 | Kunzig et al. |
| 2012/0166241 A1 | 6/2012 | Livingston et al. |
| 2012/0232430 A1 | 9/2012 | Boissy et al. |
| 2012/0239499 A1 | 9/2012 | Zughaib et al. |
| 2012/0252501 A1 | 10/2012 | Smith et al. |
| 2012/0323431 A1 | 12/2012 | Wong et al. |
| 2013/0022238 A1 | 1/2013 | Wood et al. |
| 2013/0041290 A1 | 2/2013 | Kording et al. |
| 2013/0041617 A1 | 2/2013 | Pease et al. |
| 2013/0045760 A1 | 2/2013 | Obermeyer et al. |
| 2013/0101230 A1 | 4/2013 | Holeva et al. |
| 2013/0324151 A1 | 12/2013 | Lee et al. |
| 2014/0016821 A1 | 1/2014 | Arth et al. |
| 2014/0049392 A1 | 2/2014 | Wagner |
| 2014/0062774 A1* | 3/2014 | Hale ............... G01S 19/48 342/357.31 |
| 2014/0120945 A1* | 5/2014 | Sharma ............... H04W 16/20 455/456.1 |
| 2014/0193077 A1 | 7/2014 | Shiiyama et al. |
| 2014/0222711 A1 | 8/2014 | Tibbs et al. |
| 2014/0289020 A1 | 9/2014 | Schullian et al. |
| 2014/0297485 A1* | 10/2014 | Steely ............... G06Q 10/08 705/28 |
| 2014/0304123 A1 | 10/2014 | Schwartz |
| 2015/0039529 A1 | 2/2015 | Barakat |
| 2015/0062160 A1 | 3/2015 | Sakamoto et al. |
| 2015/0120597 A1 | 4/2015 | Dertadian |
| 2015/0127496 A1 | 5/2015 | Marathe et al. |
| 2015/0134403 A1 | 5/2015 | Schwartz |
| 2015/0146989 A1 | 5/2015 | Shiiyama et al. |
| 2015/0379510 A1 | 12/2015 | Smith |
| 2016/0021636 A1* | 1/2016 | Krallman ............... H04W 64/00 455/456.1 |
| 2016/0063550 A1 | 3/2016 | Caldwell |
| 2016/0189000 A1 | 6/2016 | Dube et al. |
| 2016/0198341 A1* | 7/2016 | Fransen ............... H04W 12/02 455/410 |
| 2016/0198431 A1* | 7/2016 | Pattabiraman ...... H04W 64/006 455/418 |
| 2016/0205500 A1 | 7/2016 | Lee et al. |
| 2016/0205654 A1* | 7/2016 | Robinson, Jr. ............... G01S 5/02 455/456.3 |
| 2016/0239706 A1 | 8/2016 | Dijkman et al. |
| 2016/0259339 A1 | 9/2016 | High et al. |
| 2016/0260059 A1 | 9/2016 | Benjamin et al. |
| 2016/0260301 A1 | 9/2016 | Miller et al. |
| 2016/0321729 A1 | 11/2016 | Westphal |
| 2017/0015111 A1 | 1/2017 | Asai et al. |
| 2017/0019264 A1* | 1/2017 | Nugent ............... H04W 4/023 |
| 2017/0019754 A1 | 1/2017 | Wilkinson |
| 2017/0140408 A1 | 5/2017 | Wuehler |
| 2017/0193438 A1 | 7/2017 | Jones et al. |
| 2017/0243103 A1 | 8/2017 | Linkesch et al. |
| 2017/0323412 A1 | 11/2017 | Muirhead |
| 2017/0366357 A1 | 12/2017 | Pattanaik et al. |
| 2017/0372103 A1 | 12/2017 | Lee et al. |
| 2018/0009234 A1 | 1/2018 | Ohi et al. |
| 2018/0018627 A1 | 1/2018 | Ross et al. |
| 2018/0038805 A1 | 2/2018 | Heikkila et al. |
| 2018/0039524 A1 | 2/2018 | Dettori et al. |
| 2018/0082390 A1 | 3/2018 | Leidner et al. |
| 2018/0089638 A1 | 3/2018 | Christidis et al. |
| 2018/0143995 A1 | 5/2018 | Bailey et al. |
| 2018/0196680 A1 | 7/2018 | Wang et al. |
| 2018/0217250 A1 | 8/2018 | Cristache |
| 2018/0227570 A1 | 8/2018 | Page |
| 2018/0232693 A1 | 8/2018 | Gillen et al. |
| 2018/0268348 A1 | 9/2018 | Guan |
| 2018/0293645 A1 | 10/2018 | Pannicke et al. |
| 2018/0304468 A1 | 10/2018 | Holz |
| 2018/0322453 A1 | 11/2018 | Lantz et al. |
| 2018/0342032 A1 | 11/2018 | Daigle et al. |
| 2019/0012637 A1 | 1/2019 | Gillen |
| 2019/0019144 A1 | 1/2019 | Gillen |
| 2019/0057231 A1 | 2/2019 | Bandil et al. |
| 2019/0080392 A1 | 3/2019 | Youb et al. |
| 2019/0098432 A1 | 3/2019 | Carlson et al. |
| 2019/0109702 A1 | 4/2019 | Maggu et al. |
| 2019/0130345 A1 | 5/2019 | Antor et al. |
| 2019/0190719 A1 | 6/2019 | van de Ruit et al. |
| 2019/0251385 A1 | 8/2019 | Kotula |
| 2019/0259062 A1 | 8/2019 | Caldwell |
| 2019/0340623 A1 | 11/2019 | Rivkind et al. |
| 2019/0370816 A1 | 12/2019 | Hu |
| 2020/0019927 A1 | 1/2020 | Muirhead |
| 2020/0118117 A1 | 4/2020 | McManus et al. |
| 2020/0184291 A1 | 6/2020 | Tisdel |
| 2020/0209343 A1 | 7/2020 | Connors et al. |
| 2020/0272986 A1 | 8/2020 | Bandil et al. |

FOREIGN PATENT DOCUMENTS

| | | |
|---|---|---|
| CN | 106471526 | 3/2019 |
| DE | 9306107 | 8/1994 |
| DE | 102006009802 | 4/2007 |
| DE | 202012008230 | 10/2012 |
| EP | 1246094 | 10/2002 |
| EP | 3128471 | 2/2017 |
| EP | 2593372 | 2/2018 |
| EP | 3323756 | 5/2018 |
| JP | 2006243873 | 9/2006 |
| JP | 2017019586 | 1/2017 |
| WO | 9616387 | 5/1996 |
| WO | 2008038017 | 4/2008 |
| WO | 2010114478 | 10/2010 |
| WO | 2017165909 | 10/2017 |
| WO | 2019010480 | 1/2019 |

OTHER PUBLICATIONS

GoTo Pallets inc. "The future of the pallet pooling industry begins with the G2 Pallet." Retrieved capture from http://gotopallets.com for the date of Oct. 1, 2016, 77 pages.

GoTo Pallets Marketing Brochure dated Oct. 12, 2016. Retrieved from http://gotopallets.com 8 pages.

Intermec's Intellitag RFID Technology Enables CHEP's. Global Pallet Tracking Business Wire Nov. 13, 2001: 0480.

International Search Report and Written Opinion for PCT/US2018/026461 dated Jul. 5, 2018, all pages.

International Preliminary Report on Patentability for PCT/US2018/026461 dated Jun. 25, 2019, all pages.

International Search Report and Written Opinion for PCT/US2018/030659 dated Aug. 3, 2018, all pages.

(56) References Cited

OTHER PUBLICATIONS

International Preliminary Report on Patentability for PCT/US2018/030659 dated Aug. 7, 2019, all pages.
International Search Report and Written Opinion for PCT/US2018/030672 dated Jul. 13, 2018, all pages.
International Preliminary Report on Patentability for PCT/US2018/030672 dated Nov. 5, 2019, all pages.
International Search Report and Written Opinion for PCT/US2018/031367 dated Aug. 1, 2018, all pages.
International Preliminary Report on Patentability for PCT/US2018/031367 dated Sep. 6, 2019, all pages.
International Search Report and Written Opinion for PCT/US2018/034083 dated Oct. 24, 2018, 11 pages.
International Preliminary Report on Patentability for PCT/US2018/034083 dated Nov. 26, 2019, all pages.
International Search Report and Written Opinion for PCT/US2018/045964 dated Nov. 19, 2018, all pages.
International Preliminary Report on Patentability for PCT/US2018/045964 dated Apr. 21, 2020, all pages.
International Search Report and Written Opinion for PCT/US2018/047035 dated Oct. 31, 2018, all pages.
International Preliminary Report on Patentability for PCT/US2018/047035 dated Mar. 5, 2020, all pages.
International Search Report and Written Opinion for PCT/US2018/048832 dated Oct. 30, 2018, all pages.
International Preliminary Report on Patentability for PCT/US2018/048832 dated Apr. 28, 2020, all pages.
International Search Report and Written Opinion for PCT/US2019/068476 dated Feb. 25, 2020, all pages.
International Search Report and Written Opinion for PCT/US2020/019698 dated Jun. 30, 2020, all pages.
Jihoon et al., "Geo-Fencing: Geographical-Fencing Based Energy-Aware Proactive Framework for Mobile Devices," Quality of Service (IWQOS), 2012 IEEE 20th International Workshop, Jun. 4, 2012, pp. 1-9.
Mohamed, "Detection and Tracking of Pallets using a Laser Rangefinder and Machine Learning Techniques," Retrieved from https://www.researchgate.net/profile/Ihab_S_Mohamed/publication/324165524_Detection_and_Tracking_of_Pallets_using_a_Laser_Rangefinder_and_Machine_Learning_Techniques/links/5ac2b5300f7e9bfc045f3547/Detection-and-Tracking-of-Pallets-using-a-Laser-Rangefinder, Sep. 22, 2017, 76 pages.
Pallet tracking leads RFID applications. (News Briefs). Knill, Bernie. Material Handling Management 57.1: 8(2). Penton Media, Inc., Penton Business Media, Inc. and their subsidiaries. (Jan. 2002).
"Recommendations on the Grocery Industry Pallet System," written for the the Grocery Industry Pallet Subcommittee by Cleveland Consulting Associates, Jan. 1, 1992, 16 pages.
Roussel, J., "Making the Supply Chain Everyone's Business," May 9, 2014, 8 pages.
Weber et al., "Untrusted Business Process Monitoring and Execution Using Blockchain," Medical Image Computing and Computer-Assisted Intervention—Miccai 2015 : 18th International Conference, Munich, Germany, Sep. 8, 2016, pp. 329-347.
Xin et al., "Large Visual Repository Search with Hash Collision Design Optimization", IEEE MultiMedia, IEEE Service Center, vol. 20, Issue 2, Apr. 2013, pp. 62-71.
G. Yang, K. Xu and V.O.K. Li, "Hybrid Cargo-Level Tracking System for Logistics," 2010 IEEE 71st Vehicular Technology Conference, Taipei, 2010, pp. 1-5, doi: 10.1109/VETECS.2010.5493655. (Year: 2010).
International Preliminary Report on Patentability for PCT/US2020/019698 dated Aug. 25, 2021, all pages.
Office Action and Search Report for CN 201880076616.3 dated Aug. 23, 2021, all pages.
Schuhmacher Gerhard: "ZU Container Berlin", Internet Article, Aug. 1, 2016 (Aug. 1, 2016), XP055789042, Retrieved from the Internet: URL:https://de.wikipedia.org/wiki/Datei:ZU_Container_Berlin.JPG [retrieved on Mar. 23, 2021) all pages.
Cho et al., "Design and Implementation of an Active RFID System Platform," IEEE Explore, (2005), 4 pages.
Examination report No. 1 for patent application AU 2018353840 dated Feb. 25, 2021, all pages.
Examination report No. 2 for patent application AU 2018321284 dated Mar. 23, 2022, all pages.
Glocker Maik: "DB kombibahnhof—Brucken umsetzen von lkw auf Zug", Internet Article, Jul. 20, 2016 (Jul. 20, 2016), XP055789046, Retrieved from the Internet:URL:https://www.youtube.com/watch?v=koMM6HopqiM [retrieved on Mar. 23, 2021].

\* cited by examiner

SYSTEMS AND METHODS FOR FACILITY MATCHING AND LOCALIZATION

CROSS-REFERENCES TO RELATED APPLICATIONS

This application is a continuation of U.S. patent application Ser. No. 15/969,159, filed May 2, 2018, which is incorporated herein by reference. U.S. patent application Ser. No. 15/969,159 claims the benefit of U.S. Provisional Patent Application No. 62/500,461, filed May 2, 2017, which is incorporated herein by reference.

FIELD

The present disclosure generally relates to cargo transportation utilizing pallets, and more specifically to systems and methods for matching pallets to facilities and localizing pallets.

BACKGROUND

Monitoring pallet movement through a supply and distribution chain can aid in diagnosing issues with pallet loss and recovery, pallet damage and pallet cycle time. Reducing loss, damage and cycle time may have a material benefit for entities across the supply chain. Tracking pallets through the supply chain may also facilitate tracking of the assets they carry whenever an association between the two may be captured. A key requirement for tracking and tracing pallets through the supply chain is the ability to accurately assign a device attached to a pallet, such as an active tag including a BLE, WiFi, RFID, and/or cellular device that may also have GPS capabilities, to the correct known facility. Given the sometimes harsh constraints of the operating environment where pallets are primarily indoors, a technology such as GPS alone may be unreliable. Under certain conditions, satellite-based GPS may not work and no latitude and longitude information may be available. Even when satellite-based GPS provides accurate latitude and longitude, the latitude and longitude may not be resolved or mapped to the specific address of a facility that participates in the supply chain, rendering the latitude and longitude unusable. Without this mapping, actionable metrics about movement of assets in the supply chain may not be feasible.

BRIEF SUMMARY

Provided are methods, including computer-implemented methods, devices, and computer-program products applying systems and methods for facility matching and localization. According to some embodiments of the invention, the location of a pallet at a facility within a supply chain may be determined from location data received from a device (e.g., a beacon) on the pallet. As used herein, "location data" may include any data indicative of the location of the pallet, including, but not limited to, geographic data, pressure data, light sensor data, temperature data, humidity data, movement data, environmental condition data, etc. According to some embodiments, the methods, devices, and computer-program products described herein may intelligently generate, mark, or prioritize data based on heuristics that incorporate business context, such as average speed of movement of a forklift in a service center, so as to aid machine learning algorithms that drive facility mapping. In some embodiments, the position of the pallet within the facility may also be determined. Thus, the status of pallets may be monitored as they move through the supply chain.

According to some embodiments of the invention, a computer-implemented method is provided. The method comprises receiving, at a server computer located in a cloud, location data and a device identifier from a device affixed to a pallet. The location data was generated by hardware associated with the device. The location data may include geographic data, but may alternatively or additionally include any data indicative of the location of the pallet. The pallet is located at a facility of a plurality of facilities in a supply chain. The method further comprises accessing a database storing a plurality of sets of attributes indicative of a plurality of locations of the plurality of facilities in the supply chain. The method further comprises comparing the location data to the plurality of sets of attributes to identify a matching set of attributes associated with the facility of the plurality of facilities. The location data may match the set of attributes. The method further comprises outputting an identifier of the facility.

According to some embodiments of the invention, a device is provided. The device comprises one or more processors. The device further comprises a non-transitory computer-readable medium containing instructions that, when executed by the one or more processors, cause the one or more processors to perform operations including the steps of the methods described herein.

According to some embodiments of the invention, a computer-program product is provided. The computer-program product is tangibly embodied in a non-transitory machine-readable storage medium of a device. The computer-program product includes instructions that, when executed by one or more processors, cause the one or more processors to perform operations including the steps of the methods described herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Pallets

Figure 1:
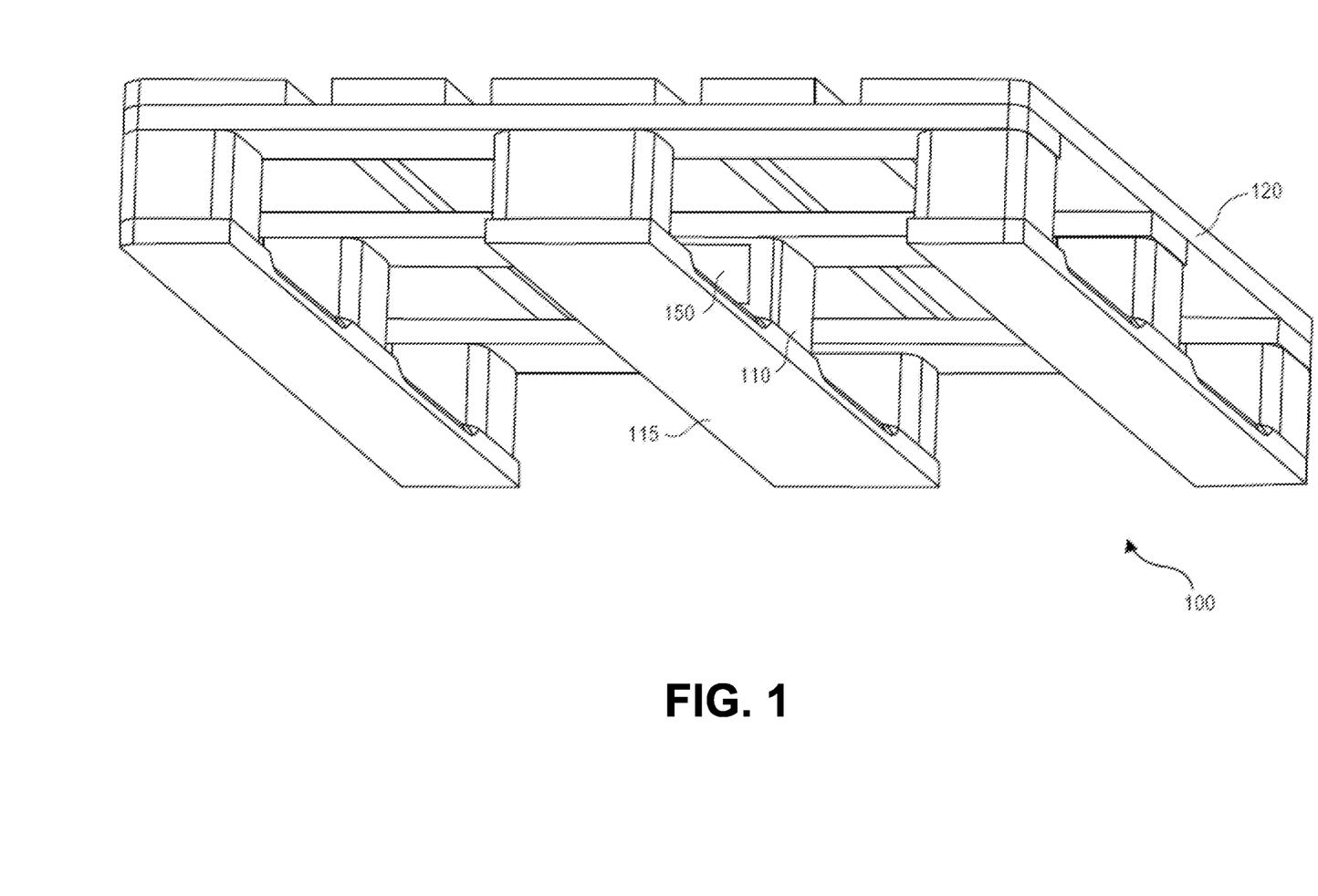
FIG. 1 is a bottom perspective view of a pallet with a beacon, in accordance with some embodiments.

A pallet may be a structure that supports physical assets for storage, presentation, handling, and/or transportation. As used herein, the term "pallet" may be used to describe any load carrier, including any type of platform, dolly, bin, container, and the like. The physical assets may be any physical assets, such as perishable or nonperishable physical goods. FIG. 1 is a bottom perspective view of a pallet 100, in accordance with some embodiments. The pallet 100 may include a base 120 and legs 110. The pallet 100 may be of any size, shape, and/or dimension, and may be made of any material or combination of materials. The base 120 and legs 110 may be of any size, shape, and/or dimensions. The base 120 may be flat and/or otherwise configured to support the shape and/or weight of the physical asset to be held on the pallet 100. Although shown as having a particular design in FIG. 1, it is contemplated that any design may be incorporated on or in the base 120. For example, the base 120 may have smaller, larger, fewer, more, differently shaped, or differently placed spacing than those shown in FIG. 1, depending on characteristics of the particular physical asset to be placed on the base 120 (e.g., weight, shape, temperature requirements, size, etc.).

The legs 110 may be sized and positioned to support the particular physical asset. In some embodiments, the legs 110 may be sized and positioned to allow a forklift, crane, or jacking device to engage and lift the pallet 100 between the legs 110. Although shown and described as having three legs 110, it is contemplated that the pallet 100 may have any suitable number of legs or no legs. For example, in some embodiments, the pallet 100 may include a base 120 on both the top and bottom of the pallet 100 with no legs. In another example, for heavier physical assets, the pallet 100 may include one or more additional legs centrally located with respect to the pallet 100 to prevent sagging of the base 120. Further, although shown and described as being in a particular orientation and having a particular size, it is contemplated that the legs 110 may be of any size (e.g., height, length, width, depth, etc.) and/or orientation (e.g., parallel to each other, perpendicular to each other, etc.).

The pallet 100 may be made of any suitable material, depending on the characteristics of the particular physical asset to be supported by the pallet 100. For example, the pallet 100 may be wooden, plastic, and/or metal. In some embodiments, the pallet 100 may be constructed to include unique physical features. In some embodiments, the base 120 may be made of a same or different material than the legs 110. In some embodiments, the base 120 and the legs 110 may form a single unitary body (e.g., formed from a single mold). In some embodiments, the base 120 may be removable from one or more of the legs 110.

Figure 2:
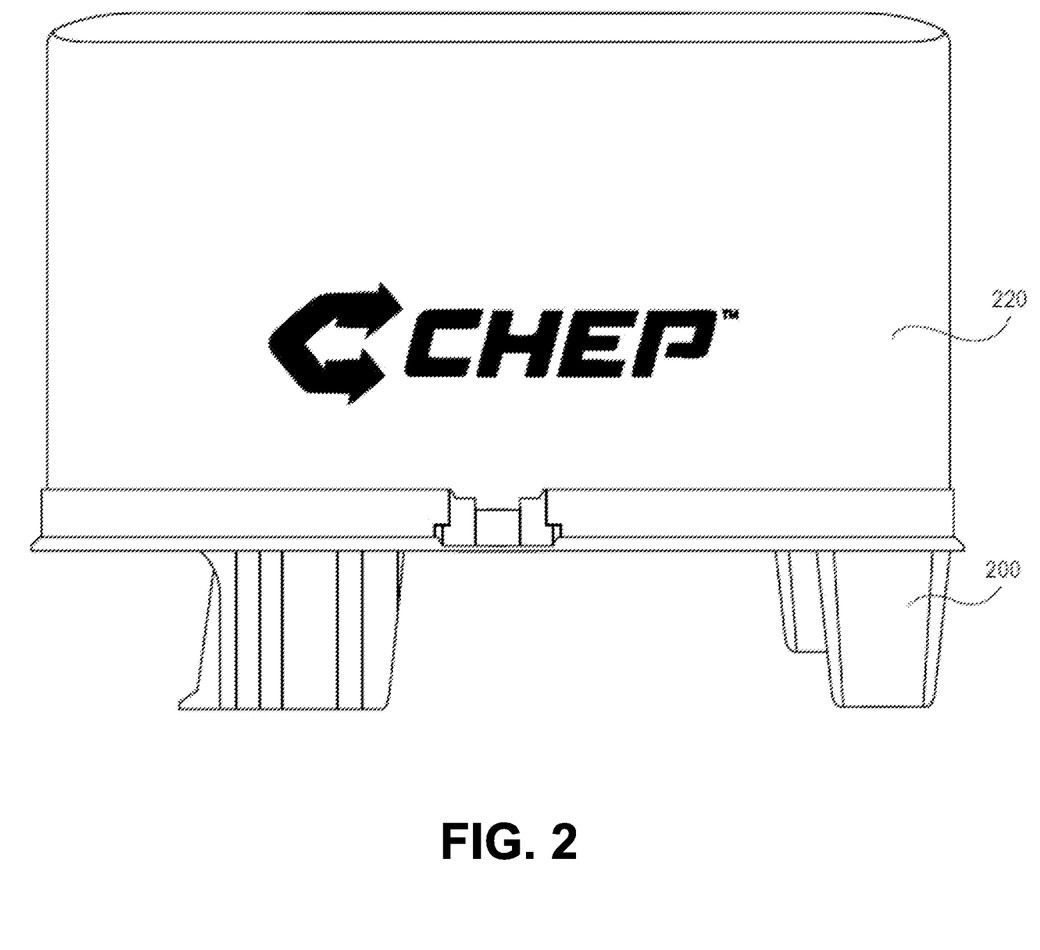
FIG. 2 is a side view of a pallet with a load, in accordance with some embodiments.

In some embodiments, additional components may be integrated with the pallet 100. For example, the underside of the pallet 100 may include a beacon 150. The beacon 150 may include a number of different functionalities. For example, the beacon 150 may be programmed with the type of physical asset located on the pallet 100 and/or an identifier of the pallet 100. The beacon 150 may further include or be in operable communication with one or more sensors configured to monitor certain conditions of the pallet 100 (e.g., environmental conditions, movements, etc.). The beacon 150 is described further herein with respect to FIG. 3. Although shown as being located in a particular position on the pallet 100, it is contemplated that the beacon 150 may be located in any suitable position on the pallet 100. FIG. 2 is a side view of another exemplary pallet 200 with a load 220 placed atop the pallet 200 for transportation, storage, presentation, etc. As used herein, pallet 100 may be referred to interchangeably with pallet 200.

Figure 3:
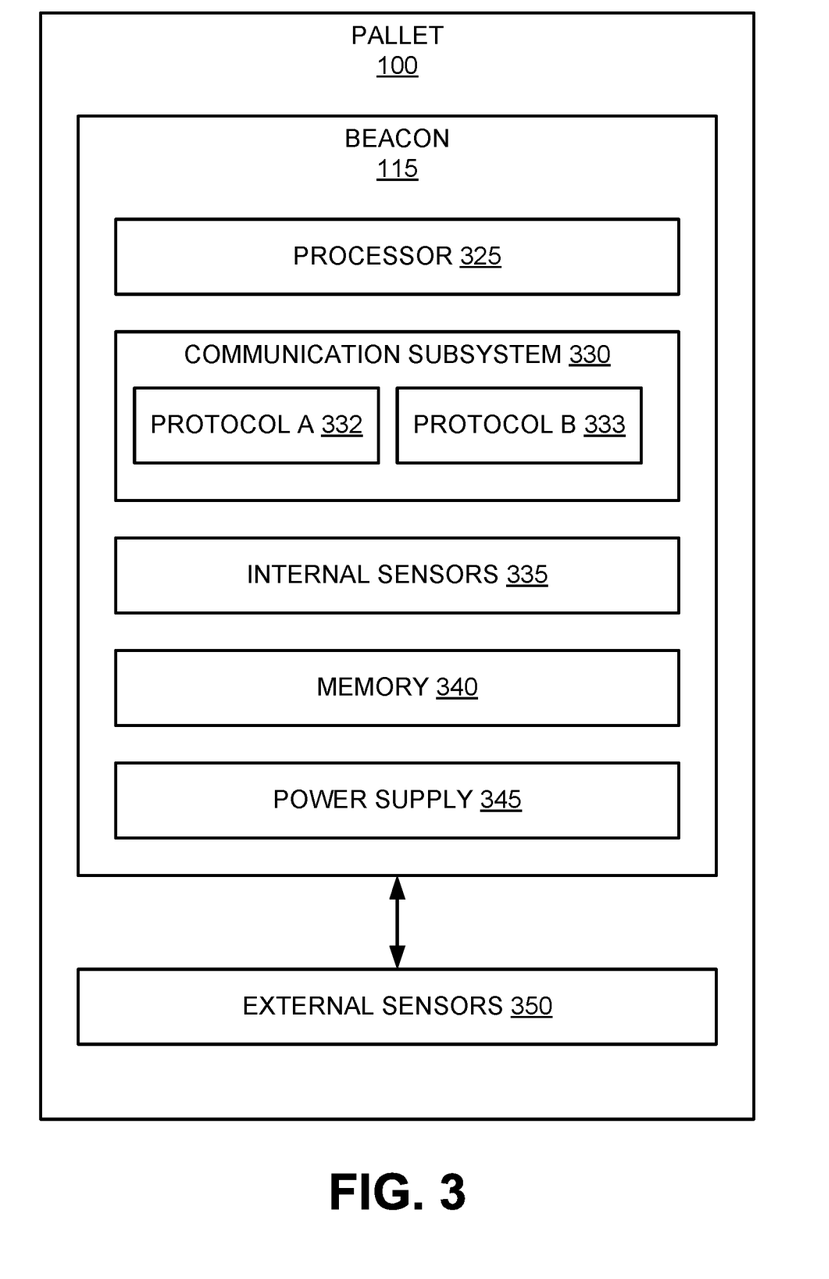
FIG. 3 is a block diagram illustrating a pallet, in accordance with some embodiments.

The pallet 100 and/or 200 may include components for performing multiple functions, as described herein. FIG. 3 is a block diagram illustrating the system components of the pallet 100 and/or 200, in accordance with some embodiments. The pallet 100 and/or 200 may include a beacon 115 in operative communication with one or more external sensors 350. The beacon 115 may include device hardware coupled to a memory 340. The device hardware may include a processor 325, a communication subsystem 330, internal sensors 335, and a power supply 345. In some embodiments, the beacon 115 may be implemented as an active tag (e.g., an RFID tag). The beacon 115 may be associated with an identifier (e.g., an active tag identifier).

The processor 325 may be implemented as one or more integrated circuits (e.g., one or more single core or multicore microprocessors and/or microcontrollers), and may be used to control the operation of the beacon 115. The processor 325 can execute a variety of programs in response to program code or computer-readable code stored in memory 340, and can maintain multiple concurrently executing programs or processes. The communication subsystem 330 may include one or more transceivers and/or connectors that can be used by the beacon 115 to communicate with other devices (e.g., the external sensors 350, access devices, etc.) and/or to connect with external networks. In some embodiments, the communication subsystem 330 may be configured to communicate using more than one protocol (e.g., protocol A 332 and protocol B 333). Protocol A 332 and protocol B 333 may be two different wired or wireless communication protocols. For example, protocol A 332 and protocol B 333 may be selected from the group including Bluetooth, Bluetooth LE, near field communication (including IoT), WiFi, cellular communication, Ethernet, fiber optics, etc. The particular protocol used for a particular communication may be determined based on any of a number of factors, including availability, signal strength, type and/or amount of power received from or remaining on power supply 345, data throughput, type of data to be communicated, size of data to be communicated, and the like.

The internal sensors 335 may include any movement-related, location-related, and/or environmental-related sensors. For example, the internal sensors 335 may include a global positioning system (GPS), an accelerometer, a gyroscope, a barometer, a thermometer, a humidity sensor, a light sensor, a microphone, combinations thereof, and/or the like. The internal sensors 335 may be coupled to the communication subsystem 330, such that sensor measurements may be transmitted off of the pallet 100 to other devices or systems, as described further herein.

The memory 340 may be implemented using any combination of any number of non-volatile memories (e.g., flash memory) and volatile memories (e.g., DRAM, SRAM), or any other non-transitory storage medium, or a combination thereof media. In some embodiments, the memory 340 may be included in the processor 325. The power supply 345 may include any wired or wireless power supply, such as a power outlet supply, a solar panel, and/or a battery.

The beacon 115 may be coupled to one or more external sensors 350 on the pallet 100 in some embodiments. The external sensors 350 may include, for example, a weight sensor and/or any of the sensors described above with respect to the internal sensors 335. In one example, the weight sensor may include circuitry that measures the weight of a load on the pallet 100. The weight sensor may transmit the weight to the beacon 115. The beacon may use the communication subsystem 330 to transmit this data off of the pallet 100 to other devices or systems, as described further herein.

Systems for Facility Matching and Localization

In some cases, it may be desirable to identify a pallet's location in the supply chain. According to some embodiments of the invention, the location of a pallet anywhere in the supply chain may be determined. Conventional tracking solutions that provide accurate location traceability rely on installed infrastructure, such as proximity sensors and fixed manual or automated processes. In other words, the instrumentation is aimed at digitizing specific events, and the location of the digitizing device provides the location of the pallet. According to some embodiments of the invention, however, fixed infrastructure and minimum human compliance are needed to determine the pallet's location. For example, according to some embodiments, data may be captured that in turn determines the pallet's location based on the installation location of the data capturing device. Once the pallet's location has been identified, this information may be used to compute supply chain visibility metrics, such as inventory at any given location or region, dwell time, and velocity metrics between regions of the supply chain or between any set of nodes within the supply chain.

Figure 4:
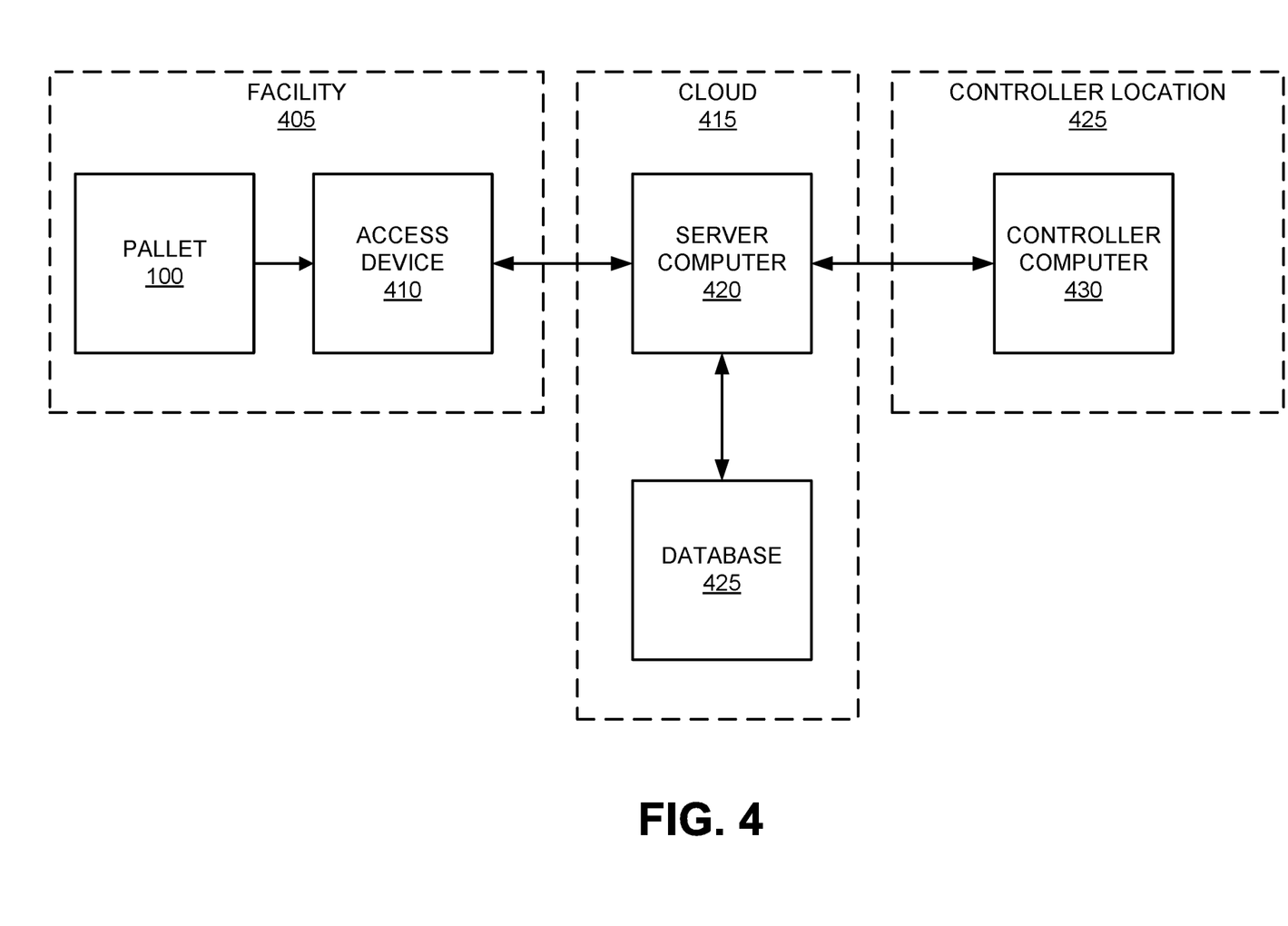
FIG. 4 is a block diagram illustrating a system for facility matching and localization, in accordance with some embodiments.

FIG. 4 is a block diagram illustrating a system for facility matching and localization, in accordance with some embodiments. The system may include a pallet 100, an access device 410, a server computer 420, a database 425, and a controller computer 430. The pallet 100 and the access device 410 may be located at a facility 405 in the supply chain, such as a warehouse or store. The server computer 420 and the database 425 may be located in the cloud, such as at one or more offsite or third party locations with online or networked storage. The controller computer 430 may be located at a controller location 425, such as at a pallet logistics and tracking company. Although shown and described with respect to a certain number of entities performing certain functions, it is contemplated that a greater or fewer number of entities may perform the functions described herein. For example, the functions of the server computer 420 may be spread across multiple server computers. In another example, the database 425 may be incorporated internally to the server computer 420.

In some embodiments, the pallet 100 may communicate data to the access device 410 via a beacon or other communication medium. The data may cause the access device 410 to perform one or more operations. For example, the pallet 100 may communicate (or cause to be communicated) data indicative of its location (e.g., GPS coordinates, a latitude and longitude, triangulated coordinates, etc.). The pallet 100 may alternatively or additionally communicate an identifier that uniquely identifies the pallet 100 and/or the beacon. The data may be communicated, for example, by a Bluetooth, Bluetooth LE, WiFi, or cellular tag on the pallet 100. When the access device 410 receives the signal, the access device 410 may process the data and forward it to the server computer 420. In some embodiments, the access device 410 may only communicate with the pallet 100 if the pallet 100 is a recognized or registered pallet. A pallet 100 may be recognized or registered based on, for example, a pallet identifier. In some embodiments, the pallet 100 may communicate a ping to the access device 410 that causes the access device 410 to capture an image of the pallet 100. The image of the pallet 100 may then be used to correlate the pallet 100 to the location where it is positioned.

The access device 410 may be any suitable electronic user device. The access device 410 may include a communication device. A communication device may provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of devices include beacons, mobile phones (e.g., cellular phones), PDAs, tablet computers, net books, laptop computers, personal music players, handheld specialized readers, watches, fitness bands, wearables, ankle bracelets, rings, earrings, key fobs, physical wallets, glasses, containers, coffee mugs, takeout containers, etc., as well as automobiles with remote communication capabilities. The access device 410 may comprise any suitable hardware and software for performing such functions, and may also include multiple devices or components (e.g., when a device has remote access to a network by tethering to another device—i.e., using the other device as a modem—both devices taken together may be considered a single communication device). Further examples of an access device 410 may include a POS or point of sale device (e.g., POS terminals), cellular phone, PDA, personal computer (PCs), tablet PC, hand-held specialized reader, set-top box, electronic cash register (ECR), virtual cash registers (VCR), kiosk, and the like. In some embodiments, the access device 410 may be included in a pallet The access device 410 may have an application installed that allows it to detect the pallet 100, identify the pallet 100, and upload location data from the pallet 100 to a server computer 420. The access device 410 may be in communication with the server computer 420. The access device 410 may forward the location data and the identifier of the pallet 100 to the server computer 420. The server computer 420 may access a database 425 storing sets of attributes indicative of locations of facilities in the supply chain. For example, each facility in the supply chain may have an entry in the database 425 with a facility identifier (e.g., a name), a physical address (e.g., a street address), and a set of attributes (e.g., a latitude and longitude associated with the physical address, an ambient temperature, a wall color, a light level, a humidity level, etc.). The server computer 420 may compare the location data received from the pallet 100 to the sets of attributes to identify a matching set of attributes associated with the facility in which the pallet 100 is located. In the case of location coordinates, the location data may be within a threshold distance of the matching set of attributes (e.g., the GPS coordinates are within 0.1 miles of the facility's latitude and longitude).

The server computer 420 may store the identifier of the pallet 100 in association with the matched facility in the database 425. For example, the server computer 420 may retrieve the entry in the database 425 associated with the matched facility and write the identifier of the pallet 100 in the record. In some embodiments, the identifier of the pallet 100 may be written to the record along with a timestamp indicating the date and time that the pallet 100 transmitted the location data that was ultimately matched to the facility. Thus, the record corresponding to a particular facility may include a plurality of identifiers of a plurality of pallets that were present at the facility at a plurality of times. In some embodiments, some or all of the functions of the server computer 420 may alternatively or additionally be performed by another entity or system, such as the access device 410.

In some embodiments, the server computer 420 may provide these records from the database 425 to a controller computer 430. The controller computer 430 may be an entity that tracks, maintains, and/or owns the pallet 100. The controller computer 430 may use this data to determine whether the pallet 100 is at the correct facility 405, to determine where the pallet 100 is in the supply chain, to determine the cycle time of the pallet 100, to predict timing of the pallet 100 at a particular location, to compute supply chain visibility metrics, etc. In some embodiments, supply chain visibility metrics may include inventory at a given facility or in a given region, dwell time, and velocity metrics between regions or between facilities in the supply chain.

Figure 5:
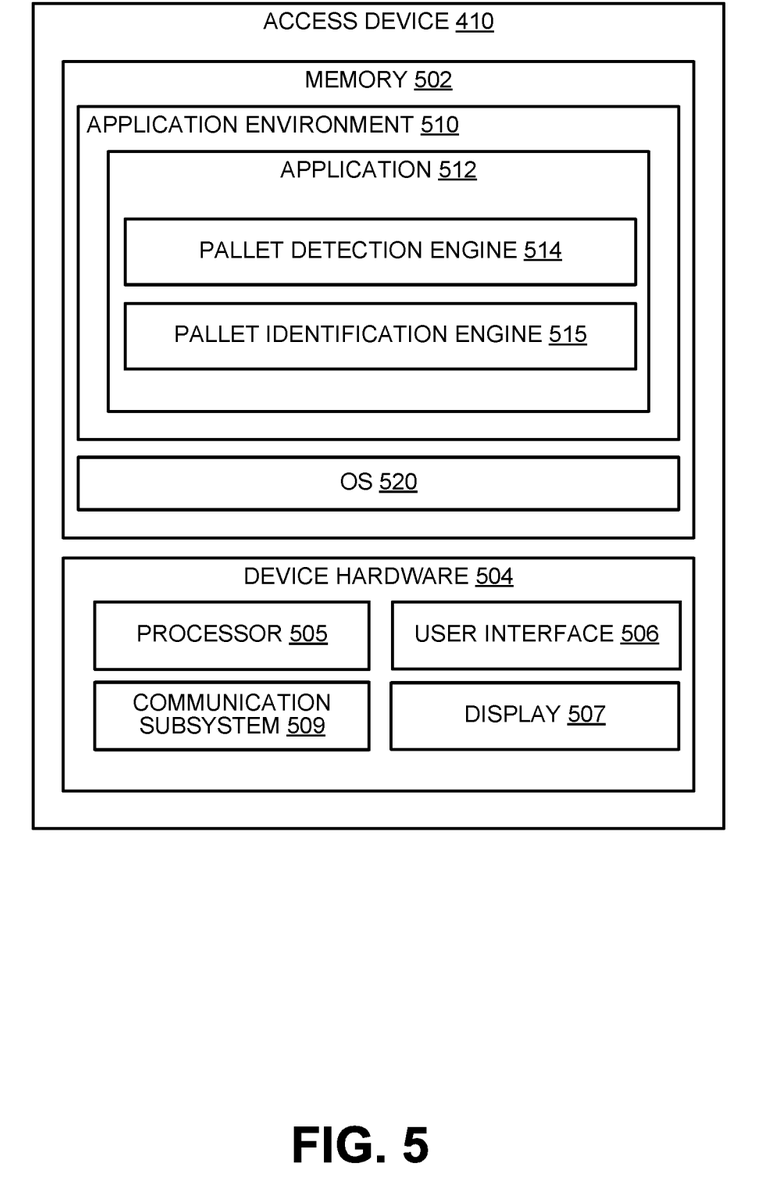
FIG. 5 is a block diagram illustrating an access device, in accordance with some embodiments.

FIG. 5 is a block diagram illustrating an access device 410, in accordance with some embodiments. The access device 410 may include device hardware 504 coupled to a memory 502. Device hardware 504 may include a processor 505, a communication subsystem 509, and a user interface 506. In some embodiments, device hardware 504 may include a display 507 (which can be part of the user interface 506).

Processor 505 can be implemented as one or more integrated circuits (e.g., one or more single core or multicore microprocessors and/or microcontrollers), and is used to control the operation of the access device 410. Processor 505 can execute a variety of programs in response to program code or computer-readable code stored in memory 502, and can maintain multiple concurrently executing programs or processes. Communication subsystem 509 may include one or more transceivers and/or connectors that can be used by access device 410 to communicate with other devices (e.g., the pallet 100) and/or to connect with external networks (e.g., to connect to the server computer 420). User interface 506 can include any combination of input and output elements to allow a user to interact with and invoke the functionalities of the access device 410. In some embodiments, user interface 506 may include a component such as display 507 that can be used for both input and output functions. Memory 502 can be implemented using any combination of any number of non-volatile memories (e.g., flash memory) and volatile memories (e.g., DRAM, SRAM), or any other non-transitory storage medium, or a combination thereof media. Memory 502 may store an operating system (OS) 520 and an application environment 510 where one or more applications reside including application 512 to be executed by processor 505.

In some embodiments, application 512 may be an application that detects and identifies pallets, and/or transmits data received from a pallet to a server computer via a communication medium that may not be available to the pallet (e.g., cellular communications). Application 512 may include a pallet detection engine 514 and a pallet identification engine 515. In some embodiments, one or more of these components can be provided by another application or component that is not part of application 512.

The pallet detection engine 514 may be configured to, in conjunction with the processor 505 and the communication subsystem 509, receive a ping (i.e., a brief signal) from a pallet in proximity to the access device 410. In some embodiments, the pallet may be configured to send a ping to the communication subsystem 509 when within a certain distance of the access device 410 (e.g., 10 feet). In some embodiments, the pallet may be configured to send a ping to the communication subsystem 509 when within any communication range of the access device 410 (e.g., 50 feet), and the pallet detection engine 514 may monitor the distance between the access device 410 and the pallet based on the pings. In some embodiments, when the ping is received by the pallet detection engine 514, the pallet detection engine 514 may transmit a request for location data to the pallet. In some embodiments, when the ping is received by the pallet detection engine 514, the pallet detection engine 514 sends a response ping indicating that the access device 410 is within communication range of the pallet. The response ping may cause the pallet to push the location data to the access device 410. As used herein, "location data" may include any data indicative of the location of the pallet, including, but not limited to, geographic data, pressure data, light sensor data, temperature data, humidity data, movement data, environmental condition data, etc. Location data may be obtained using triangulation, as described further herein. In some embodiments, location data may be obtained using magnetometer data. In some embodiments, location data may be obtained from another device or pallet that has improved awareness of its location. For example, a first pallet may have a GPS fix and may assign a high confidence at being at a certain location, while a second pallet is deeper in the facility and does not have GPS access, WiFi access, or an uncertain cellular fix. If the first pallet detects a BLE signal from the second pallet, the location assignment and confidence may be transferred from the first pallet to the second pallet.

The pallet identification engine 515 may be configured to, in conjunction with the processor 505, receive an identifier from a pallet with its location data. The pallet identification engine 515 may extract the identifier from the other data. In some embodiments, the pallet identification engine 515 may translate the identifier from a first format used by the pallet (i.e., a format stored on the beacon) into a second format used by external systems (e.g., the server computer, the controller computer, etc.). The pallet identification engine 515 may perform this translation by accessing a lookup table with entries corresponding to the received identifier and corresponding identifiers used by external systems.

Figure 6:
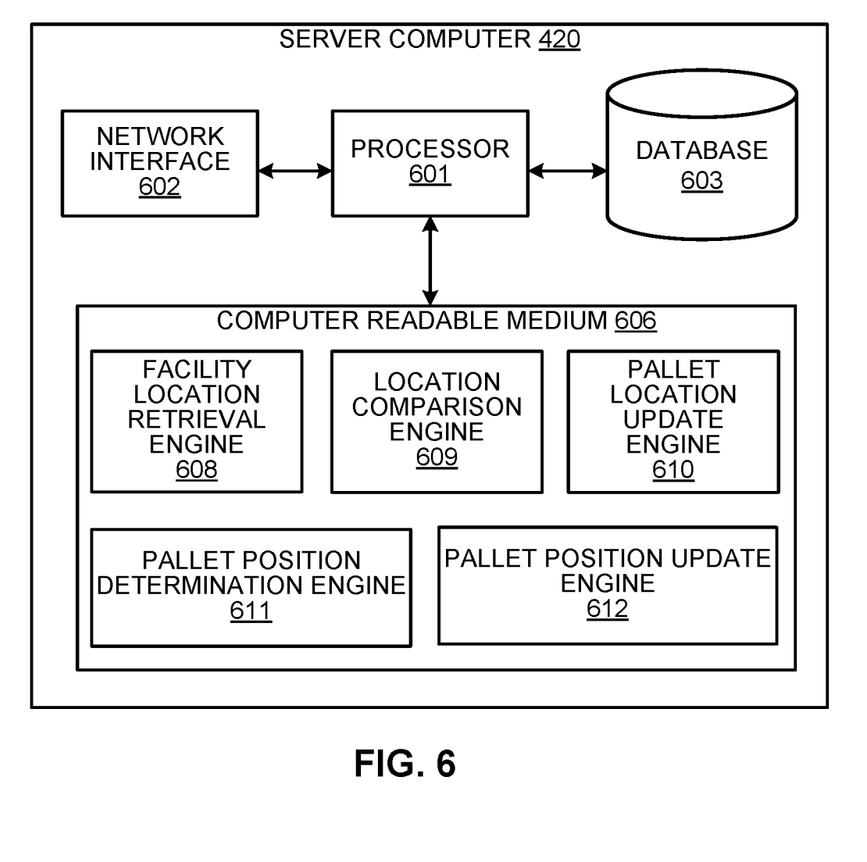
FIG. 6 is a block diagram illustrating a server computer, in accordance with some embodiments.

FIG. 6 is a block diagram illustrating a server computer 420, in accordance with some embodiments. Server computer 420 may include a processor 601 coupled to a network interface 602 and a computer readable medium 606. Server computer 420 may also include or otherwise have access to a database 603 that may be internal or external to the server computer 420.

Processor 601 may include one or more microprocessors to execute program components for performing the facility matching and localization functions of the server computer 420. Network interface 602 may be configured to connect to one or more communication networks to allow the server computer 420 to communicate with other entities, such as the access device, the controller computer, etc. Computer readable medium 606 may include any combination of one or more volatile and/or non-volatile memories, for example, RAM, DRAM, SRAM, ROM, flash, or any other suitable memory components. Computer readable medium 606 may store code executable by the processor 601 for implementing some or all of the facility matching and localization functions of server computer 420. For example, computer readable medium 606 may include code implementing a facility location retrieval engine 608, a location comparison engine 609, a pallet location update engine 610, a pallet position determination engine 611, and a pallet position update engine 612.

The facility location retrieval engine 608 may be configured to, in conjunction with the processor 601, access the database 603 to retrieve sets of attributes, including any data indicative of locations of facilities in the supply chain (e.g., coordinates, environmental conditions, visual features, etc.). In some embodiments, the facility location retrieval engine 608 may be configured to retrieve only sets of attributes corresponding to facilities that meet certain criteria. The criteria may include facilities within a certain region (e.g., an expected region of the pallet), type of facility (e.g., shipper facility, carrier facility, storefront, etc.), etc. This may reduce the number of facility locations to which the location data from the pallet needs to be compared, which may reduce processing time.

The location comparison engine 609 may be configured to, in conjunction with the processor 601, receive location data from a pallet (e.g., via an access device) and the retrieved facility locations from the facility location retrieval engine 608. The location comparison engine 609 may be configured to compare the location data to the sets of attributes of facilities to identify a matching facility location. In some embodiments, the location comparison engine 609 may convert disparate formats between the location data and the facility locations into the same format to facilitate accurate comparison. For example, if the location data includes GPS coordinates and the facility locations include physical addresses, the location comparison engine 609 may convert the physical addresses into GPS coordinates before comparing them. The matching facility location may be identified based on its location within a threshold distance of the location data. For example, the distance between the location data and the matching facility location may be less than a 0.15 mile threshold.

In some embodiments, the location comparison engine 609 may be configured to identify multiple potential matching facilities (e.g., all facilities within 0.1 miles of the location data) and provide a distance metric between the matching facilities and the location data, e.g., 0.05 miles from the location data, 0.07 miles from the location data, etc. The multiple potential matching facilities may be ranked from the closest to the location data to the furthest from the location data in some embodiments. The multiple potential matching facilities may further be ranked based on certain criteria, such as the expected location or facility of the pallet within the supply chain at the time the location data was transmitted. For example, some factors that may make one facility more likely than another may include matching transaction data, a more likely facility type (such as a service center being likely to ship to a manufacturer), a model of the supply chain (e.g., one manufacturing facility may be most likely to ship to a certain store), and/or the like. In some embodiments, the highest ranked facility of the multiple potential matching facilities may be selected as the matching facility. In some embodiments, the location comparison engine 609 may provide a degree of confidence for the matching facility. In some embodiments, there may be no potential facility matches based on criteria.

In some embodiments, the location comparison engine 609 may compare other data indicative of the location of the pallet to data associated with a facility to select and/or rank facilities. For example, in some embodiments, the location data received from the pallet may include environmental condition data, such as temperature data, movement data (e.g., forklift speeds versus conveyor belt speeds), moisture data and humidity data (e.g., in a washing machine), etc. The location comparison engine 609 may translate this data into attributes associated with a facility in order to match the pallet to a known facility.

The pallet location update engine 610 may be configured to, in conjunction with the processor 601, store the identifier of the pallet in association with the matching facility. For example, the pallet location update engine 610 may retrieve the entry in the database 603 associated with the matched facility (e.g., using a facility identifier, such as a name or a unique code) and write the identifier of the pallet in the record. In some embodiments, the identifier of the pallet may be written to the record along with a timestamp indicating the date and time that the pallet transmitted the location data that was ultimately matched to the facility. Thus, the record corresponding to a particular facility may include a plurality of identifiers of a plurality of pallets that were present at the facility at a plurality of times. This record may be used to analyze a particular facility's status and/or load in the supply chain.

Conversely, the pallet location update engine 610 may alternatively or additionally be configured to, in conjunction with the processor 601, retrieve the entry in the database 603 associated with the identifier of the pallet and write the matched facility in the record. In some embodiments, the matched facility may be written to the record along with a timestamp indicating the date and time that the pallet transmitted the location data that was ultimately matched to the facility. Thus, the record corresponding to a particular pallet may include a plurality of facilities at which the pallet was present at a plurality of times. This record may be used to analyze a particular pallet's movement through the supply chain.

In some embodiments in which other location data (e.g., humidity data, temperature data, etc.) are provided by the pallet and specific attributes associated with a facility are previously unknown, the pallet location update engine 610 may create attributes in the record associated with the matching facility corresponding to the other location data provided by the pallet. In some embodiments, the pallet location update engine 610 may be self-learning and/or healing in that it may auto-learn attributes associated with a known location, auto-create known locations with well-known attributes while allowing administrators to review and update information, and/or auto-learn addresses based on third party services that can provide physical addresses and business and/or category information for a given set of facility data.

The pallet position determination engine 611 may be configured to, in conjunction with the processor 601, receive the location data from the pallet (e.g., via an access device), along with the matching facility from the location comparison engine 609. The pallet position determination engine 611 may be configured to retrieve from the database 603 a file including a floor plan of the matching facility. The pallet position determination engine 611 may be configured to map the location data from the pallet onto the floor plan of the facility to identify a position of the pallet within the facility (e.g., in a storage area, in a transportation area, at the loading dock, etc.). For example, the pallet position determination engine 611 may map a latitude and longitude of the pallet onto a visual representation of a floor plan of a facility to determine to which part of the floor plan the latitude and longitude correspond.

The pallet position update engine 612 may be configured to, in conjunction with the processor 601, receive data indicative of the position of the pallet within the facility from the pallet position determination engine 611. In some embodiments, the pallet position update engine 612 may be configured to store the position of the pallet along with its identifier in association with the matching facility in the database 603. In some embodiments, the pallet position update engine 612 may be configured to retrieve the entry in the database 603 associated with the identifier of the pallet and write the position of the pallet along with the matched facility in the record.

Methods for Facility Matching and Localization

Figure 7:
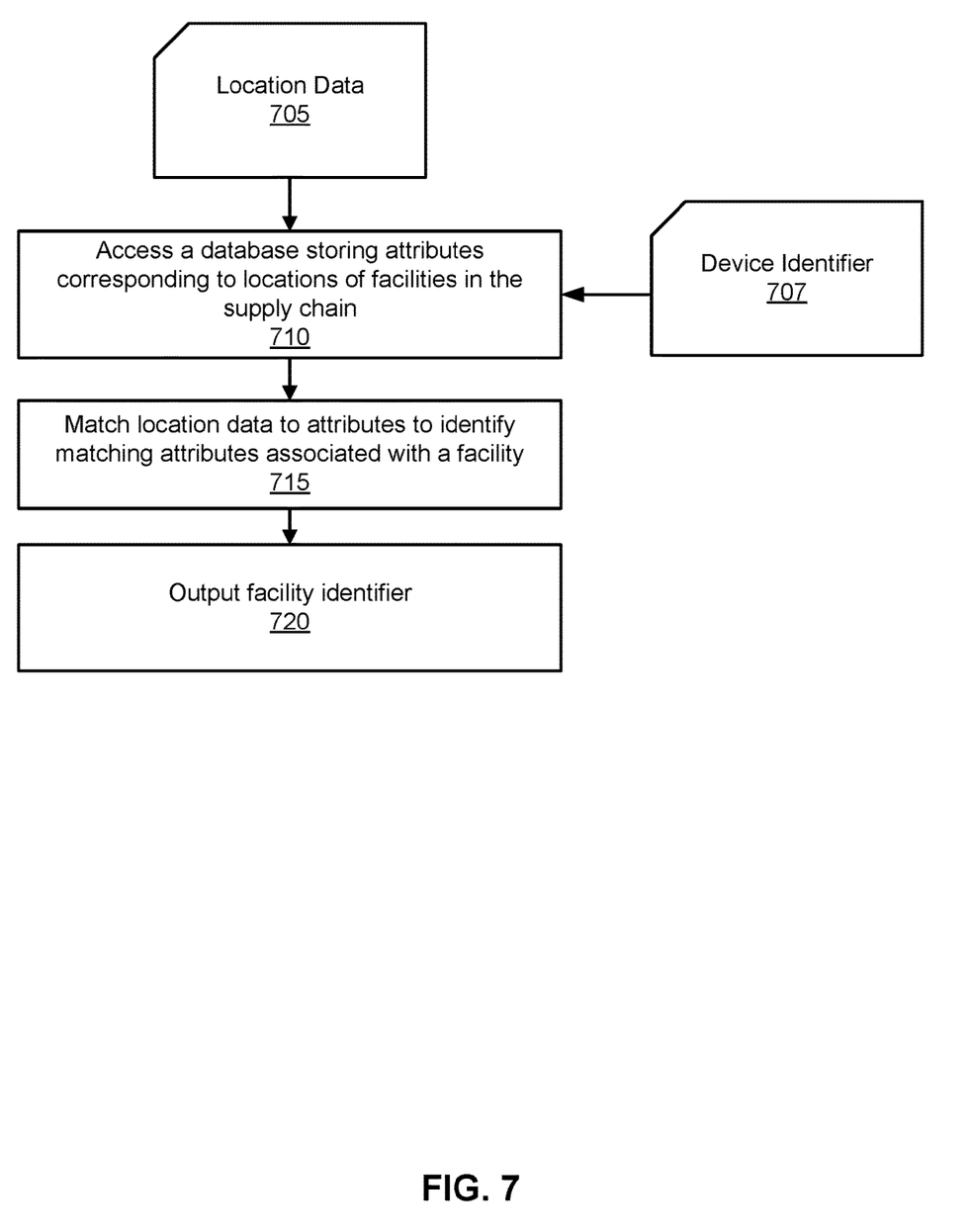
FIG. 7 is a flow chart illustrating a method for facility matching and localization, in accordance with some embodiments.

A variety of methods may be implemented by the above-described systems. FIG. 7 is a flow chart illustrating an exemplary method for facility matching and localization, in accordance with some embodiments. At process block 410, location data 705 and a device identifier 707 are received at a server computer. The location data 705 may be received from a device (e.g., a beacon) affixed to a pallet. The location data was generated by hardware (e.g., a GPS) associated with the device. In some embodiments, the hardware may be located in a mobile device (e.g., a mobile phone). In some embodiments, the location data may include data generated using at least one WiFi router. For example, the location data may be generated by pinging three or more WiFi routers and triangulating the location of the device based on the signal strength. In some embodiments, the location data may include data generated using at least one cellular tower. For example, the location data may be generated by receiving data from three or more cellular towers and triangulating the location of the device based on the signal strength. In some embodiments, the device may not receive data from, or evoke a response from, the WiFi routers or the cellular towers. Instead, the triangulation may be based on the number of "sighted" WiFi routers and cellular towers and their relative signal strengths. In some embodiments, the location data may be generated using Bluetooth. In some embodiments, the location data may include a MAC ID. The pallet may be located at a facility of a plurality of facilities in a supply chain. Further at process block 410, a database is accessed. The database may store one or more sets of attributes corresponding to locations of the plurality of facilities in the supply chain.

At process block 713, the location data 705 is matched to the sets of attributes to identify a matching set of attributes associated with the facility in which the pallet is located. Further at process block 715, if the location data 705 includes geographic data and the set of attributes includes geographic data, a threshold distance may be received, and the location data is determined to be within the threshold distance of the set of attributes. At process block 720, the facility identifier 707 may be output. In some embodiments, the location data 705 and/or the device identifier 707 may further be stored in association with the facility identifier in the database.

In some embodiments in which the location data 705 includes geographic data, a file including a floor plan of the matching facility may further be retrieved from the database. The geographic data may be mapped onto the floor plan of the facility to identify a position of the device within the facility. Data indicative of the position of the device may be stored in the database.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined encoder-decoder (CODEC).

What is claimed is:

1. A method comprising:
   determining, at a beacon affixed to a pallet, location data that is indicative of a location of the pallet using one or more sensors coupled to the beacon, wherein the pallet is located at a facility of one or more facilities in a supply chain;
   sending, from the beacon to a server, the location data and a device identifier associated with the beacon affixed to a pallet;
   accessing, by the server, a database storing one or more sets of attributes corresponding to the one or more facilities in the supply chain, wherein the facility where the pallet is currently located is associated with a set of attributes indicative of a location of the facility and a facility identifier, and the database includes the set of attributes associated with the facility;
   matching, by the server, the location data to the set of attributes associated with the facility in the database to thereby identify the facility as a current location of the pallet;
   assigning, by the server, the location of the pallet to the facility in the database.

2. The method of claim 1, wherein the location data includes a set of coordinates, and wherein the method further comprises:
   retrieving a file including a floor plan of the facility from the database;

mapping the set of coordinates onto the floor plan of the facility to identify a position of the beacon affixed to the pallet within the facility; and storing data indicative of the position in the database.

3. The method of claim 1, further comprising:

storing a timestamp and the device identifier in a database record of the facility such that the database record of the facility comprises a plurality of device identifiers of a plurality of pallets that are present at the facility.

4. The method of claim 1, wherein the one or more sensors comprises a GPS device and the location data comprises GPS coordinates.

5. The method of claim 1, wherein the location data comprises data generated using information received from at least one WiFi router.

6. The method of claim 1, wherein the location data comprises data generated using information received from at least one cellular tower and the location data comprises triangulated coordinates.

7. One or more non-transitory computer-readable media comprising instructions that, when executed by one or more processors, cause the one or more processors to perform operations comprising:

determining, at a beacon affixed to a pallet, location data that is indicative of a location of the pallet using one or more sensors coupled to the beacon, wherein the pallet is located at a facility of one or more facilities in a supply chain;

sending, from the beacon to a server, the location data and a device identifier associated with the beacon affixed to a pallet;

accessing, by the server, a database storing one or more sets of attributes corresponding to the one or more facilities in the supply chain, wherein the facility where the pallet is currently located is associated with a set of attributes indicative of a location of the facility and a facility identifier, and the database includes the set of attributes associated with the facility;

matching, by the server, the location data to the set of attributes associated with the facility in the database to thereby identify the facility as a current location of the pallet;

assigning, by the server, the location of the pallet to the facility in the database.

8. The one or more non-transitory computer-readable media of claim 7, wherein the set of attributes comprises a latitude and a longitude associated with a physical location of the facility.

9. The one or more non-transitory computer-readable media of claim 8, wherein matching the location data to the set of attributes associated with the facility in the database comprises:

determining, by the server, whether the location data is within a threshold distance of the latitude and longitude associated with the physical location of the facility.

10. The one or more non-transitory computer-readable media of claim 7, wherein the location data comprises environmental conditions sensed by the one or more sensors.

11. The one or more non-transitory computer-readable media of claim 10, wherein the environmental conditions comprise temperature data, pressure data, humidity data, light sensor data, or movement data.

12. The one or more non-transitory computer-readable media of claim 7, wherein the operations further comprise receiving, by the server, the location data from a second beacon affixed to a second pallet in the facility.

13. The one or more non-transitory computer-readable media of claim 7, wherein accessing the database storing the one or more sets of attributes corresponding to the one or more facilities in the supply chain comprises:

retrieving, by the server, only sets of attributes corresponding to facilities in the one or more facilities that are located in an expected region of the pallet.

14. The one or more non-transitory computer-readable media of claim 7, wherein accessing the database storing the one or more sets of attributes corresponding to the one or more facilities in the supply chain comprises:

retrieving, by the server, only sets of attributes corresponding to facilities in the one or more facilities that are of an expected facility type for the pallet.

15. A system comprising:

a beacon affixed to a pallet, wherein the beacon is configured to perform first operations comprising:

determining, at a beacon affixed to a pallet, location data that is indicative of a location of the pallet using one or more sensors coupled to the beacon, wherein the pallet is located at a facility of one or more facilities in a supply chain;

sending, from the beacon to a server, the location data and a device identifier associated with the beacon affixed to a pallet; and the server configured to perform second operations comprising:

accessing, by the server, a database storing one or more sets of attributes corresponding to the one or more facilities in the supply chain, wherein the facility where the pallet is currently located is associated with a set of attributes indicative of a location of the facility and a facility identifier, and the database includes the set of attributes associated with the facility;

matching, by the server, the location data to the set of attributes associated with the facility in the database to thereby identify the facility as a current location of the pallet;

assigning, by the server, the location of the pallet to the facility in the database.

16. The system of claim 15, wherein matching the location data to the set of attributes associated with the facility in the database comprises:

identifying, by the server, at least two facilities for which the associated sets of attributes match the location data; and selecting, by the server, the facility from the at least two facilities based on an expected location of the pallet.

17. The system of claim 15, wherein matching the location data to the set of attributes associated with the facility in the database comprises:

identifying, by the server, at least two facilities for which the associated sets of attributes match the location data; and selecting, by the server, the facility from the at least two facilities based on an expected type of facility to receive the pallet.

18. The system of claim 15, wherein the second operations further comprise:

identifying, by the server, data in the location data that are not part of the set of attributes of the facility; and adding, by the server, new attributes to the set of attributes of the facility corresponding to the data.

19. The system of claim 15, wherein the location data is received by the server from a mobile phone.

20. The system of claim 15, wherein the second operations further comprise generating, by the server, a physical address of the facility by sending the set of attributes to a third-party service and receiving the physical address and return.

* * * * *